United States Patent
Mitsche

[15] 3,644,219
[45] Feb. 22, 1972

[54] PREPARATION OF A CRYSTALLINE ALUMINOSILICATE-ALUMINA CATALYST COMPOSITION

[72] Inventor: Roy T. Mitsche, Island Lake, Ill.
[73] Assignee: Universal Oil Products Company, Des Plaines, Ill.
[22] Filed: Feb. 11, 1970
[21] Appl. No.: 10,637

Related U.S. Application Data

[63] Continuation-in-part of Ser. No. 760,691, Sept. 18, 1968, Pat. No. 3,562,345.

[52] U.S. Cl. ........................................252/442, 252/455 Z
[51] Int. Cl. ................................B01j 11/78, B01j 11/40
[58] Field of Search ......................................252/442, 455 Z

[56] References Cited

UNITED STATES PATENTS

| | | | |
|---|---|---|---|
| 3,409,685 | 11/1968 | Donaldson et al. | 252/455 X |
| 3,463,744 | 8/1969 | Mitsche | 252/442 |
| 3,511,773 | 5/1970 | Addison et al. | 252/455 X |
| 3,546,102 | 12/1970 | Bertolacini | 252/455 X |

Primary Examiner—Daniel E. Wyman
Assistant Examiner—C. F. Dees
Attorney—James R. Hoatson, Jr. and Robert W. Welch

[57] ABSTRACT

A method of preparing a catalyst composition comprising as essential components thereof, a crystalline aluminosilicate with a mordenite crystal structure containing alumina fixed in combination therewith. The catalyst composition is aged in an alkaline media to yield a catalyst substantially improved in activity, particularly with respect to the transalkylation of alkylaromatic hydrocarbons.

5 Claims, No Drawings

PREPARATION OF A CRYSTALLINE ALUMINOSILICATE-ALUMINA CATALYST COMPOSITION

This application is a continuation-in-part application of a copending application Ser. No. 760,691, filed Sept. 18, 1968, now U.S. Pat. No. 3,562,345.

Crystalline aluminosilicates, or zeolites, of which mordenite is one example, are well known in the art and have found extensive application as hydrocarbon conversion catalysts or as a component thereof. Such materials are of ordered crystalline structure often visualized as a three-dimensional network of fundamental structural units consisting of silicon-centered $SiO_4$ and aluminum-centered $AlO_4$ tetrahedra—the tetrahedra being interconnected by a mutual sharing of apical oxygen atoms and arranged to form cages or cavities in open communication through smaller intracrystalline channels or pore openings whose narrowest cross section has essentially a uniform diameter characteristic of each crystalline aluminosilicate variety. To effect a chemical balance, each $AlO_4$ tetrahedra has a cation associated therewith—usually sodium or other exchangeable cation. The aforementioned cages or cavities are occupied by water molecules and by the last mentioned cations, both of which exhibit considerable freedom of movement permitting ion-exchange and reversible dehydration.

The crystalline aluminosilicates employed in the manufacture of the catalyst composition of this invention are of the mordenite crystal structure, highly siliceous in nature and generally characterized by a silica-alumina mole ratio of from about 6 to about 12 as manufactured or found in nature. The mordenite crystal structure comprises 4- and 5-membered rings of the $SiO_4$ and $AlO_4$ tetrahedra so arranged that the crystal lattice comprises pores and channels running parallel along the crystal axis to give a tubular configuration. This structure is unique among the crystalline aluminosilicates since the channels or tubes do not intersect, and access to the cages or cavities is in only one direction. For this reason, the mordenite structure is frequently referred to as two-dimensional. This is in contrast to other well-known crystalline aluminosilicates, for example faujasite and Zeolite A, in which the cavities can be entered from three directions. Mordenite which has been acid extracted, caustic extracted, or otherwise treated to increase the silica-alumina mole ratio while maintaining the mordenite crystal structure, may be used in the manufacture of the catalyst composition of this invention. The catalyst composition of this invention is particularly useful as a catalyst with respect to the transalkylation or disproportionation of alkylaromatic hydrocarbons.

It is an object of this invention to present a new and useful method of preparing a catalyst composition comprising a crystalline aluminosilicate having the mordenite crystal structure and containing alumina fixed in combination therewith. In one of its broad aspects, the present invention embodies a method of preparing a catalyst composition which comprises heating a crystalline aluminosilicate characterized by the mordenite crystal structure in admixture with an alumina sol, thereafter separating extraneous sol and treating the crystalline aluminosilicate-sol product at conditions effecting gellation of the sol, aging the crystalline aluminosilicate-gel product in an alkaline media for at least about 5 hours and then washing, drying and calcining the resulting composition.

A more specific embodiment relates to a method of preparing a catalyst composition which comprises heating a crystalline aluminosilicate characterized by a mordenite crystal structure in admixture with an aluminum chloride sol, thereafter separating extraneous sol and treating the crystalline aluminosilicate-sol product at conditions effecting gellation of the sol, aging the crystalline aluminosilicate gel product in aqueous ammonia solution for a period of from about 10 to about 24 hours at a temperature of from about 75° to about 100° C., said crystalline aluminosilicate being heated in admixture with said sol prior to being dried at a temperature in excess of about 200° C.

Other objects and embodiments of this invention will become apparent in the following detailed specification.

As will become apparent with reference to the method of preparation hereinafter presented, the composition of this invention comprises a crystalline aluminosilicate having a mordenite crystal structure and containing alumina fixed in physical and/or chemical combination therewith in contrast to the conventional practice of suspending the crystalline aluminosilicate in a refractory metal oxide. Thus, the present invention does not contemplate the presence of any substantial amount of extraneous alumina in the catalyst composition. In the manufacture of the catalyst composition of this invention, the crystalline aluminosilicate is suitably heated in admixture with the alumina sol at a temperature of from about 50° to about 150° C. at conditions to obviate any substantial loss of water. Thus, the crystalline aluminosilicate and alumina sol may be heated together in a closed vessel. Preferably, the crystalline aluminosilicate and alumina sol are heated together at a temperature of from about 90° to about 110° C. under reflux conditions for a period of from about 1 to about 24 hours or more. The alumina sol is preferably, although not necessarily, an aluminum chloride sol such as is prepared by digesting aluminum metal in an acidic reagent such as hydrochloric acid and/or aqueous aluminum chloride at about the boiling point of the mixture—usually a temperature of from about 80° to about 105° C. However, other alumina sols derived from other aluminum salts such as aluminum sulfate, aluminum nitrate, sodium aluminate, etc., can be employed.

The supernatant or extraneous alumina sol is decanted, filtered, or otherwise separated from the aluminosilicate-alumina sol product which is subsequently treated at conditions effecting the gellation of the reacted sol. Typically, the aluminosilicate-alumina sol product is treated in contact with an aqueous ammonia solution whereby gellation of the sol occurs within about a 2-hour period. Pursuant to the present invention, the crystalline aluminosilicate-gel product is further treated in a basic or alkaline media for a period of at least about 5 hours. This alkaline age makes a significant contribution to the increased activity of the catalyst composition of this invention, particularly with respect to the transalkylation of alkylaromatic hydrocarbons, as will hereinafter appear. The alkaline aging media is preferably an aqueous ammonia solution such as employed to effect the aforesaid alumina gel precipitation. The alkaline age is suitably effected at an elevated temperature and at a pressure to maintain a substantially liquid water phase. Preferably, the crystalline aluminosilicate-gel product is aged at about atmospheric pressure conditions at a temperature of from about 75° to about 100° C., the aging being effected over a period of from about 10 to about 24 hours. The resulting crystalline aluminosilicate-alumina gel product is usually water washed and dried at a temperature of from about 95° to about 300° C. for a period of from about 2 to about 24 hours or more. The dried aluminosilicate-alumina gel product may then be pilled or extruded using known techniques to obtain particles of the desired shape or size. When the composition is to be employed as a catalyst, it is advantageously further calcined at a temperature of from about 475° to about 750° C., suitably in an air atmosphere, for a period of from about 0.5 to about 10 hours. The activity of the composition as a catalyst is favored by a calcination temperature in the lower range, say from about 475° to about 550° C.

It has been found that when, as aforesaid, the crystalline aluminosilicate is admixed with the alumina sol prior to being dried at a temperature in excess of about 200° C., and preferably prior to being dried at a temperature in excess of about 110° C., the crystalline aluminosilicate so dried embodies a peculiar affinity for alumina not otherwise observed. This peculiar affinity is evidenced by a greater capacity of the aluminosilicate for alumina fixed in physical and/or chemical combination therewith as herein contemplated. The peculiar affinity is further evident from the catalytic activity of the composition with respect to the aforementioned transalkylation reaction—a more than twofold increase in activity and stability being realized.

The catalyst composition of this invention is particularly useful for the transalkylation of alkylaromatic hydrocarbons.

Thus, an alkylaromatic hydrocarbon having from about 7 to about 15 carbon atoms per molecule is treated at transalkylation conditions including a temperature of from about 200° to about 480° C. and a pressure of from about atmospheric to about 1,500 pounds per square inch gauge (p.s.i.g.) in contact with a catalyst comprising essentially the composition of this invention to form products of higher and lower number of carbon atoms than said alkylaromatic hydrocarbon. The preferred composition employed as the catalyst comprises alumina suspended in mordenite, said mordenite comprising from about 50 to about 75 weight percent of said composition.

The alkylaromatic hydrocarbon feed stock can be a substantially pure alkylaromatic hydrocarbon of from about 7 to about 15 carbon atoms, a mixture of such alkylaromatic hydrocarbons, or a hydrocarbon fraction rich in said alkylaromatics. Suitable alkylaromatic hydrocarbons include alkylbenzenes and alkylnaphthalenes, preferably with an alkyl group of less than about four carbon atoms. The catalyst composition is particularly effective in the treatment of more difficulty transalkylatable toluene to form benzene, xylenes or other polymethylbenzenes.

The transalkylation, or disproportionation, reaction can be effected in contact with the catalyst composition of this invention in any conventional or otherwise convenient manner and may comprise a batch or continuous type of operation. A preferred type of operation is of the continuous type. For example, the above described catalyst is disposed in a fixed bed in a reaction zone of a vertical tubular reactor and the alkylaromatic feed stock charged in an upflow or downflow manner, the reaction zone being maintained at a temperature of from about 200° to about 480° C., preferably at a temperature of from about 220° to about 460° C. Although pressure does not appear to be an important variable with respect to the transalkylation reaction of this invention, the process is generally conducted in the presence of an imposed hydrogen pressure to provide from about 1 to about 10 moles of hydrogen per mole of hydrocarbon. However, there is no net consumption of hydrogen in the process, and the hydrogen charged is recovered from the reactor effluent and recycled.

The transalkylation reaction can be effected over a wide range of space velocities. In general, the processes conducted at a space velocity of from about 0.2 to about 10. Space velocities herein referred to are liquid hourly space velocities, (LHSV) i.e., volume of charge per volume of catalyst per hour. While the catalyst composition prepared by the present method permits unusually high space velocities indicative of high activity, the catalyst composition is particularly noteworthy because of its relatively high stability at a high activity level.

The composition prepared in accordance with the method of this invention may be employed as a component of a catalyst comprising any of the several catalytically active metallic materials in the oxidized or reduced stage. Of particular interest are those catalytic composites comprising one or more metals of Group VIB and VIII including molybdenum, tungsten, chromium, iron, nickel, cobalt, platinum, palladium, ruthenium, rhodium, osmium and iridium. Thus, the composite of this invention can be utilized advantageously as a catalyst or component thereof to effect a variety of hydrocarbon conversion reactions involving reaction conditions comprising a temperature in the 25–760° C. range. The catalysts are particularly useful in effecting the hydrocracking of heavy oils, including vacuum residuals, to form petroleum products in the middle distillate range utilizing a temperature of from about 260° to about 1,560° C. and pressures of from about 500 to about 1,000 p.s.i.g. Said hydrocarbon conversion reactions further include polymerization of olefins, particularly ethylene, propylene, 1-butene, 2-butene, isobutylene and also higher boiling olefins, at polymerization reaction conditions. The composite of this invention is also useful as a catalyst or component thereof in effecting the alkylation of isoparaffins with olefins or other alkylating agents including, for example, alkylhalides and the like; and also the alkylation of isobutene, isopentane, and/or isohexane with ethylene, propylene, 1-butene, etc., or mixtures thereof; and also the alkylation of aromatics with olefins or other alkylating agents, particularly the alkylation of benzene, toluene, etc., with propylene, butylene, and higher boiling olefins, including nonenes, decenes, undecenes, etc., the foregoing alkylation reactions being effected at alkylation conditions disclosed in the art. The composition of this invention is further useful in the isomerization of paraffins, particularly n-butane, n-pentane, n-hexane, n-heptane, n-octane, etc., or mixtures thereof, including isomerization of less highly branched chain saturated hydrocarbons to more highly branched chain saturated hydrocarbons such as the isomerization of 2- or 3-methylpentane to 2,2- and 2,2-dimethylbutane, isomerization of naphthenes, for example, the isomerization of dimethylcyclopentane to methylcyclohexane, isomerization of methylcyclopentane to cyclohexane, etc., at isomerization reaction conditions. Other hydrocarbon conversion reactions including the reforming of naphtha to gasoline, dehydrogenation of ethylbenzene to styrene, and the hydrogenation of benzene to cyclohexane, are effectively catalyzed using the composition of this invention as a catalyst or component thereof.

The following examples are presented in illustration of the method of this invention and are not intended as an undue limitation on the generally broad scope of the invention as set out in the appended claims.

EXAMPLE I

Alumina was fixed in combination with mordenite which had not previously been treated at a temperature in excess of about 100° C. which included 13.5 weight percent volatile matter and 4.8 weight percent Na. The preparation consisted of heating 300 grams of said mordenite in about 700 cc. of an aluminum chloride hydrosol using a glass vessel equipped with an overhead reflux condenser. The hydrosol comprised 12.03 weight percent alumina, 10.3 weight percent chloride and had a specific gravity of 1.3455. The mixture was heated for about 24 hours at reflux conditions (95°–100° C.). Thereafter, the mordenite-sol product was recovered by filtration. The product included about 325 cc. of sol. The mordenite-sol product was slurried in a 15 percent aqueous ammonium solution for about 2 hours at 95° C. to precipitate the gel. The mordenite-gel product was thereafter washed with dilute aqueous ammonia until the filtrate was chloride-free. The product was ovendried at 110° C., pilled, and calcined at 550° C. The final product analyzed 71 percent mordenite and 29 percent alumina.

EXAMPLE II

The preparation of example I was repeated with the exception that the mordenite-gel product, slurried in a 15 percent aqueous ammonia solution for about 2 hours, was further aged in said solution for an additional 18 hours. The product was thereafter washed, dried, pilled and calcined as set out in example I.

The catalyst for example I and example II were evaluated with respect to the transalkylation of toluene. Thus, toluene was charged downflow in contact with the catalyst composition at a liquid hourly space velocity of 2.0 and at transalkylation conditions including a pressure of 500 p.s.i.g., a temperature of 420° C., and a hydrogen to hydrocarbon mole ratio of 10. The catalyst bed measured 50 cc. of one-eighth pills. The catalyst composition of example I effected a 16.8 weight percent conversion of the toluene feed stock. On the other hand, a 36.1 weight percent conversion was obtained with the catalyst composition of example II. These examples make it apparent that the alkaline or basic age of this invention is an important factor in the manufacture of an improved catalyst composition.

I claim as my invention:

1. A method of preparing a catalyst composition which comprises heating a crystalline aluminosilicate characterized by the mordenite crystal structure in admixture with an alumina sol, thereafter separating extraneous sol and treating the crystalline aluminosilicate-sol product at conditions effecting gellation of the sol, aging the crystalline aluminosilicate-gel product in an alkaline media for at least about 5 hours and then washing, drying and calcining the resulting composition.

2. The method of claim 1 further characterized in that said alumina sol is an aluminum chloride sol.

3. The method of claim 1 further characterized in that said crystalline aluminosilicate is heated in admixture with said alumina sol prior to being dried at a temperature in excess of about 200° C.

4. The method of claim 1 further characterized in that said alkaline media is an aqueous ammonia solution.

5. The method of claim 1 further characterized in that said crystalline aluminosilicate-gel product is aged in an aqueous ammonia solution for a period of from about 10 to about 24 hours at a temperature of from about 75° to about 100° C.

* * * * *